(12) United States Patent
Quaade

(10) Patent No.: US 8,473,226 B2
(45) Date of Patent: Jun. 25, 2013

(54) METHOD OF DETERMINING THE FILLING LEVEL OF A SOLID AMMONIA STORAGE MEDIUM IN AN AMMONIA STORAGE CONTAINER

(75) Inventor: Ulrich Joachim Quaade, Bagsværd (DK)

(73) Assignee: Amminex A/S, Søborg (DK)

( * ) Notice: Subject to any disclaimer, the term of this patent is extended or adjusted under 35 U.S.C. 154(b) by 307 days.

(21) Appl. No.: 12/884,527

(22) Filed: Sep. 17, 2010

(65) Prior Publication Data

US 2012/0072135 A1    Mar. 22, 2012

(51) Int. Cl.
*G06F 23/00* (2006.01)
*G06F 23/14* (2006.01)

(52) U.S. Cl.
USPC .................. 702/55; 423/352; 702/50

(58) Field of Classification Search
USPC ............ 702/12, 25, 45, 47, 50, 55, 97, 98, 702/99, 136, 138, 176; 141/4; 422/601; 423/235, 352
See application file for complete search history.

(56) References Cited

U.S. PATENT DOCUMENTS

| | | | |
|---|---|---|---|
| 5,219,243 A | 6/1993 | McCoy | |
| 8,084,008 B2* | 12/2011 | Johansen et al. | 423/352 |
| 2011/0284121 A1* | 11/2011 | Johannessen et al. | 141/4 |
| 2012/0045379 A1* | 2/2012 | Johannessen et al. | 423/235 |

FOREIGN PATENT DOCUMENTS

| | | |
|---|---|---|
| DE | 103 23 591 | 12/2004 |
| DE | 10 2008 001 004 | 10/2009 |
| EP | 0 059 863 | 9/1982 |
| EP | 1 977 817 | 10/2008 |
| WO | WO 2006/081824 | 8/2006 |

OTHER PUBLICATIONS

Huang, H.H. et al., "Modeling of gas-solid chemisorption in chemical heat pumps," Separation and Purification Technology, vol. 34(1-3) (2004) pp. 191-200.

* cited by examiner

*Primary Examiner* — John H Le
(74) *Attorney, Agent, or Firm* — Frost Brown Todd LLC

(57) ABSTRACT

A method of determining an average degree of saturation with ammonia (X) of a solid ammonia storage medium porous or not and capable of ad- or absorbing and desorbing ammonia reversibly in a storage container is described. A part of the volume ($V_{con}$) of the container is occupied by gaseous ammonia of a pressure (p) and defines a free volume ($V_{free}$)). Ammonia flows out of the container with a flow (f). n pairs (($f_i$, $p_i$), ($F_i$, $p_i$)) of flows ($f_i$), or accumulated flows ($F_i$), and pressures ($p_i$) are sampled at a sequence of points of time ($t_i$), i=1 ... n and n≧2; an estimate volume value ($V_{fit}$) on the basis of the sampled pairs (($f_i$, $p_i$), ($F_i$, $p_i$)) is determined; and the degree of saturation with ammonia (X) is determined by applying a predetermined relationship (Rel) between a plurality of estimate volume values ($V_{fit}$) and a plurality of values of the average degree of saturation with ammonia (X) to the determined estimate volume value ($V_{fit}$).

20 Claims, 8 Drawing Sheets

METHOD OF DETERMINING THE FILLING LEVEL OF A SOLID AMMONIA STORAGE MEDIUM IN AN AMMONIA STORAGE CONTAINER

FIELD OF THE INVENTION

The present invention generally relates to a method of determining the average degree of saturation (also referred to as filling level) of a solid ammonia-containing storage medium in an ammonia storage container and more particularly to a method which is based on a model describing a relationship between flows and associated pressures in the ammonia storage container.

BACKGROUND OF THE INVENTION

Selective catalytic reduction (SCR) with ammonia as the reductant is often used for removing $NO_x$ from exhaust gases in automotive applications. Ammonia may directly be supplied from an ammonia-containing solid ammonia storage medium capable of reversibly ad- or absorbing and desorbing ammonia. The ammonia is consumed during driving whereby the storage medium is depleted. A device similar to a level sensor in a liquid tank is desirable to alert the driver that the ammonia storage tank will soon be empty in which case the car will start to pollute the environment with $NO_x$.

Other applications of solid ammonia storage media include delivery of ammonia as fuel to for example fuel cells in energy generation applications. Here, a determination of filling level is of high value as well.

SUMMARY OF THE INVENTION

A method is provided of determining an average degree of saturation with ammonia (also referred to as X) of a solid ammonia storage medium porous or not and capable of ad- or absorbing and desorbing ammonia reversibly in a storage container having a volume (also referred to as container volume $V_{con}$) and essentially free of gases other than gaseous ammonia, wherein a part of the container volume is occupied by said ammonia having a pressure (also referred to as p) and defines a free volume (also referred to as $V_{free}$), said container having at least one opening through which ammonia flows out of the container with a flow (also referred to as f), wherein the free volume, the pressure and the flow vary with time (also referred to as t), the method comprising: sampling n pairs (($f_i$, $p_i$), ($F_i$, $p_i$)) of flows ($f_i$) or accumulated flows ($F_i$) and pressures ($p_i$) at a sequence of points of time ($t_i$), i=1 ... n and n≧2; determining an estimate volume value (also referred to as $V_{fit}$) of the free volume $V_{free}$ on the basis of the sampled pairs (($f_i$, $p_i$), ($F_i$, $p_i$)); and determining the average degree of saturation with ammonia (X) of the ammonia storage medium by applying a predetermined relationship (also referred to as Rel) between a plurality of estimate volume values ($V_{fit}$) and a plurality of values of the average degree of saturation with ammonia (X) of the ammonia storage medium to the determined estimate value ($V_{fit}$).

According to another aspect a system is provided comprising: an ammonia storage container containing a solid ammonia storage medium capable of ad- or absorbing and desorbing ammonia reversibly, a dosing device arranged to control and/or measure the ammonia flow out of the ammonia storage container, a pressure sensor arranged to measure the pressure in the ammonia storage container, and an electronic control unit arranged to collect data of pressure $p_i$ and flow $f_i$, or accumulated flows $F_i$, and perform the method of the previous paragraph to determine the average degree of saturation with ammonia of the solid ammonia-containing storage medium in the ammonia storage container.

According to another aspect, a computer program product in the form of a machine-readable medium with program code stored on it is provided. The program code is arranged to carry out a method, when executed on a computer system, of determining an average degree of saturation with ammonia (X) of a solid ammonia storage medium porous or not and capable of ad- or absorbing and desorbing ammonia reversibly in a storage container having a volume ($V_{con}$) and essentially free of gases other than gaseous ammonia, wherein a part of the volume ($V_{con}$) of the container is occupied by said ammonia having a pressure (p) and defines a free volume ($V_{free}$), said container having at least one opening through which ammonia flows out of the container with a flow (f), wherein the free volume ($V_{free}$), the pressure (p) and the flow (f) vary with time (t), the method comprising: sampling n pairs (($f_i$, $p_i$), ($F_i$, $p_i$)) of flows ($f_i$), or accumulated flows ($F_i$), and pressures ($p_i$) at a sequence of points of time $t_i$, i=1 ... n and n≧2; determining an estimate volume value ($V_{fit}$) on the basis of the sampled pairs (($f_i$, $p_i$), ($F_i$, $p_i$)); and determining the average degree of saturation with ammonia (X) of the ammonia storage medium by applying a predetermined relationship (Rel) between a pluralitiy of estimate volume values ($V_{fit}$) and a plurality of values of the average degree of saturation with ammonia (X) of the ammonia storage medium to the determined estimate volume value ($V_{fit}$).

BRIEF DESCRIPTION OF THE DRAWINGS

Embodiments of the invention will now be described, by way of example, and with reference to the accompanying drawings, in which.

Figure 1:
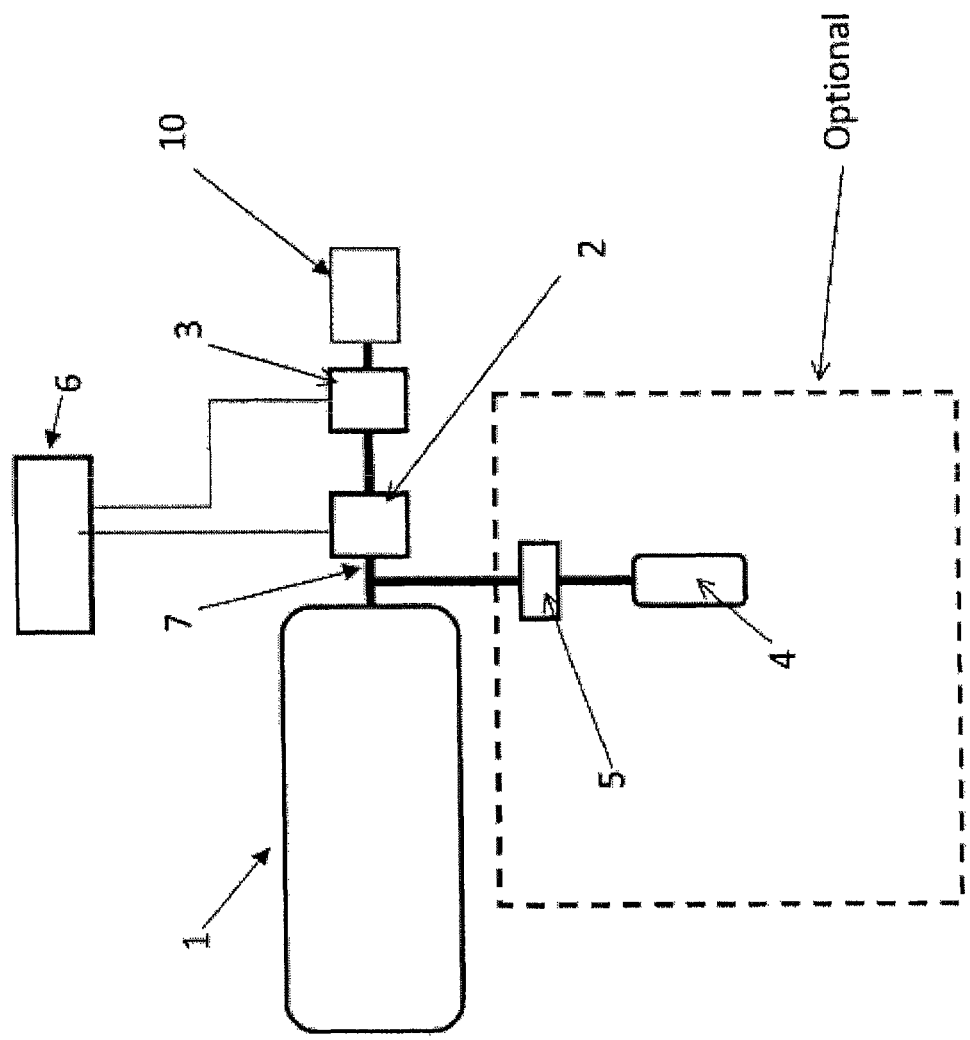
FIG. 1 shows a system layout of a system which applies a method of determining the average saturation degree of an ammonia-containing storage medium (also referred to as filling level of the storage medium) in an ammonia storage container (also referred to as cartridge) according to the embodiments of the invention.

The drawings and the description of the drawings are of embodiments of the invention and not of the invention itself.

DESCRIPTION OF EMBODIMENTS

In a first aspect the invention relates to determining an average degree of saturation with ammonia X of a solid ammonia storage medium or material in a container or cartridge (hereinafter also denoted as the filling level of the medium or simply of the container or cartridge) capable of ad- or absorbing and desorbing ammonia reversibly in a storage container 1 essentially free of gases other than ammonia. The filling level or the average degree of saturation of the ammonia storage medium X in the container is discussed in more detail below. An average saturation degree of 0 (or 0 percent saturation) corresponds to no ammonia that can be desorbed from the storage medium under the conditions of use of the storage medium, and an average saturation degree of 1 (100 percent saturation) corresponds to the maximum amount of ammonia that can be present in or bound by the ammonia storage medium.

Filling level detection in liquid materials or granular/powder materials in a container is often a relatively simple task of determining the position of the surface. Having knowledge of the container shape, the surface position can be converted into a remaining capacity. For solid ammonia storage materials the situation is more complicated since the material is, for example, present as a hard block of material that does not simply move to the bottom of the container. Especially, for ammonia storage materials which reversibly ad- or absorb ammonia, filling level (or average saturation degree) detection within a container including the ammonia storage material is difficult. The ammonia is bound in a solid matrix and after depletion the solid matrix is still present.

The aim of the present invention is to obtain information about the average degree of saturation with ammonia of an ammonia storage material in a container or cartridge. Particularly in mobile applications it is highly desirable to know the average degree of saturation with ammonia X (filling level) of the ammonia-containing storage medium, since a cartridge e.g. in an automobile, which is used to deliver ammonia to the SCR reaction of the exhaust gas, shall usually be replaced in good time before it will be empty.

Solid ammonia storage media capable of ad- or absorbing and desorbing ammonia reversibly are well known. Examples are certain zeolites, acid-activated carbon and in particular metal ammine salts, as e.g. described in WO 2006/081824, incorporated herein by reference and particularly referred to as forming part of this description. These materials when containing ammonia are capable of desorbing ammonia when they are heated and/or exposed to a vacuum. The desorbed ammonia can then be delivered to a consumer, such as a catalyst for selective catalytic reduction (SCR) of NOx in he exhaust gas of a combustion engine e.g. in a car.

At all average saturation degrees of the ammonia storage material, the ammonia which has a pressure p, occupies the free volume $V_{free}$ which is defined as the total volume inside a storage material-containing container (the walls of the container and other parts installed therein except for the solid ammonia storage medium defining a container volume $V_{con}$) that can be occupied by a gas, or more specifically essentially by ammonia having a pressure p. The free volume can be thought of, for example, a combination of void volume (wherein no storage material at all is present) and a volume of pores of the storage material.

The gas present in the container consists essentially of ammonia, however, small amounts, e.g. about 10% or less, such about 5% or less, more preferably about 2% or less and particularly about 1% or less of other gases, such as oxygen, nitrogen, carbon dioxide, water vapor, HCl, $Cl_2$, and $SO_2$ may be present.

The emergence of the free volume $V_{free}$ can be presented and explained as follow.

If a mass of an ammonia storage medium (or material) fully saturated with ammona, also referred to as $m_{sat}$, is introduced into a container of volume $V_{con}$, the initial free volume at maximum saturation of the material (before any ammonia has been dosed out of the container) is $V_{free,sat} = V_{con} - m_{sat} \rho_{sat}$, wherein $\rho_{sat}$ is the density of the fully saturated storage material (it should be kept in mind that the density $\rho$ of material is defined and measured with a material having no vacancies, pores or any other voids,) $m_{sat} \rho_{sat}$ is the volume of the fully saturated material introduced into the container, if the material is or were in compacted or single crystalline form (in contrast to e.g. to bulk volume). If $V_{free,sat}$ is zero, the material initially fills the container exactly. If $V_{free,sat}$ is positive, this means that initially there is a volume in the container that is not occupied by solid material. This could be either an initial porosity arising e.g. from a saturated storage material not completely compacted or from a void volume where there is no storage material present. This positive $V_{free,sat}$ would be occupied by gaseous ammonia. (A negative value of $V_{free,sat}$ does not have any real physical meaning).

As ammonia is flowing out of (or degassed from) the container, the storage material shrinks in its overall dimensions and/or becomes porous. This increases the void volume and/or the pore volume in which ammonia is present.

The value of $V_{free}$ can in a very good approximation be measured experimentally, e.g. by filling it with an inert and virtually ideal gas under suitable conditions, e.g. low temperature. The conditions for such measurements cannot be established e.g. during operation of a vehicle. The method of this invention enables the filling level to be determined with a relatively high precision, even if the conditions for a measurement as mentioned above of the free volume $V_{free}$ are not established, e.g. during vehicle operation.

The average saturation degree is defined as $$X = m_{amm}/m_{amm,sat}$$

wherein $m_{amm}$ is the mass of ammonia in partially ammonia-depleted storage material, which is available for further desorption (or for further flowing out of the container) under the conditions of operation of the container or cartridge, or in the fully depleted storage material with respect to ammonia available under the conditions of operation, and $m_{amm,sat}$ is the mass of ammonia available for desorption in the fully saturated storage material.

Since the void volume and/or the pore volume increases with desorption and dosing out, i.e. with a decrease of the average saturation degree X of the medium, the $V_{free}$ is correlated with the average ammonia saturation degree X of the storage medium.

Of course the container or cartridge which holds the ammonia storage medium will have an opening for the outflow of ammonia to the consumer.

For reasons of technical simplicity, a value for the free volume $V_{free}$ is determined by measuring, for example, only pressures in the container holding the storage material and the outflow out of the container. A value determined for the free volume $V_{free}$ by means of the experimental data, e.g. for these two parameters is herein denoted "estimate volume value $V_{fit}$ for the free volume $V_{free}$" or "estimate volume value $V_{fit}$" or simply "$V_{fit}$". By applying the predetermined relationship between a plurality of values of $V_{fit}$ and a plurality of values of the average ammonia saturation degree X to $V_{fit}$, an estimate average degree of saturation X is obtained.

$V_{fit}$ is obtained by making use of a correlation between outflow (or dosing) out of the cartridge and the associated drop in pressure in the cartridge. In general, when an amount of gas is flowing out (or dosed) from a closed volume at some pressure, the pressure will drop. If the volume is small, the pressure drop will be large, and if the volume is large, the pressure drop will be small.

The pressures $p_i$ in the cartridge measured at points of time $t_i$, and the flows $f_i$ out of the container measured at the same points of time can be related to obtain an estimate value $V_{fit}$ for the free volume $V_{free}$ by one or more estimation algorithms. $V_{fit}$ can be determined, e.g., by dosing a known amount of ammonia from the cartridge while monitoring the pressure drop. It was surprisingly discovered that an estimate volume value $V_{fit}$ and, by applying the predetermined relationship to it, the average saturation degree X of the storage medium (or filling level of the cartridge) can be determined by measuring a set of only these two parameters $p_i$ and $f_i$. It is not necessary and preferably not performed in the present invention to measure any other parameter in order to determine the ammonia filling level of the container or cartridge.

In a cartridge containing ammonia storage material the determination of $V_{fit}$ from the dosing and pressure drop is not trivial, since a pressure drop will induce increased desorption of ammonia from the storage material.

The desorption rate is depending on the temperature profile of the solid medium (which is non-uniform), the equilibrium pressure (which is depending on the non-uniform temperature of the medium), the actual pressure and the like. Furthermore, the cartridge is always in a non-equilibrium state.

Therefore, in a first aspect, the present invention describes a method which, together with a scheme to estimate certain key parameters, enables the determination of $V_{fit}$ and thus the filling level by monitoring the amount of ammonia dosed out of the cartridge and the associated pressure variations.

Generally, the method employs any useful model describing a relationship between flows $f_i$ and associated pressures $p_i$ at a sequence of points of time $t_i$ and having at least a model volume V for the free volume $V_{free}$ of the container as a parameter to be determined. The method includes sampling n pairs of flows and pressures $f_i$, $p_i$, $i=1\ldots n$, $n\geq 2$, determining the estimate volume value $V_{fit}$ that, e.g., best fits the model to the pairs $f_i$, $p_i$, and then determining the average saturation degree (filling level) by applying the predetermined relationship Rel between a plurality of estimate volume values $V_{fit}$ and a plurality of values of the average degree of saturation with (or filling level of) ammonia X to the estimate volume value $V_{fit}$.

The method can be used for any storage of gas in a solid or liquid storage medium, where depletion is associated with an increase in gas volume, e.g. pore volume.

In the following, a specific exemplary model represented by a model equation Modeleq will be developed which establishes the relationship between different flows $f_i$ and associated pressures $p_i$ at a sequence of points of time $t_i$. The model has at least a model value V for the free volume $V_{free}$ as a parameter to be determined:

The model uses the equation of state for ideal gases ("ideal gas law") which connects pressure and volume as follows:

pV=nRT, where p is the pressure of the gas, V the volume of the gas, n the number of moles, R the gas constant and T the temperature of the gas.

In the following, "V" relates to a model value of a (potentially simplified) model for the free volume in the container obtained e.g. by the ideal gas law, or, as the case may be, e.g. the Van der Waals equation of state for real gases (see below).

This equation of state of a hypothetical ideal gas is a good approximation to the behavior of many gases under many conditions. It should, however, be mentioned that for the purpose of the invention other equations, such as the Van der Waals equation of state for real gases, could be used.

For a dynamic situation, where ammonia flows out from the volume V at constant temperature T and at a flow rate $f=f(t)$, t being time, the ideal gas relationship reads:

$$\frac{dn}{dt} = \frac{V}{RT}\frac{dp}{dt} = -f.$$

Thus, if p(t) and f(t) are known over some period of time, the volume V can be determined. This is, however, only valid, as long as there are no sources of gas in the system.

With a source in the system that produces gas at a rate r, the following equation is obtained:

$$\frac{dn}{dt} = \frac{V}{RT}\frac{dp}{dt} = r - f$$

In this case, the knowledge of r is also required to obtain a value for V. This is the situation that is encountered in a heated storage container with a solid ammonia storage material. The source term is desorption (or absorption, when the storage material is a sink) of ammonia from the storage material.

The differential coefficient dp/dt introduces noise in the equation when the pressure p is the sampled pressure and dp/dt is replaced with a discretized numerical approximation (numerical differentiation tends to introduce "noise"). To avoid the differentiation, the equation is instead integrated on both sides of the equation to give:

$$\int_{t_1}^{t_2} \frac{dn}{dt} dt = \frac{V}{RT}\int_{t_1}^{t_2} \frac{dp}{dt} dt = \int_{t_1}^{t_2} r\, dt - \int_{t_1}^{t_2} f\, dt$$

or in discrete steps:

$$\frac{V}{RT}(p_n - p_1) = \left(\sum_{i=1}^{n} r_i - \sum_{i=1}^{n} f_i\right)\Delta t$$

(Modeleq) (The term $(p_n - p_1)$ is obtained using the fundamental theorem of calculus.) with $p_1 = p(t_1), p_n = p(t_2), r_1 = r(t_1), r_n = r(t_2), f_1 = f(t_1), f_n = f(t_2)$ assuming that T is almost constant. Here the sampling interval is $$\Delta t = \frac{t_2 - t_1}{n}.$$

Since the container with the storage material is designed to desorb ammonia at a rate comparable to the dosing, both r and f are significant. In general the desorption rate (or absorption rate, as the case may be) depends on the time t, the temperature T, the pressure p and the degree of saturation x: $r=r(p,T,x)$, wherein x is the saturation degree of the active storage material, as explained below.

One possible approximation for determining the degassing rate is found in Separation and Purification Technology 34 (2004)191-200, incorporated herein by reference:

Equation I (Rateeq)

$$r = n'k_0 e^{-\frac{E_a}{RT}} x^M \frac{p_{eq} - p}{p_{eq}} \quad \text{(Rateeq)}$$

where $k_0$ is a constant, $E_a$ is the activation energy for desorbing one mole of ammonia, R the gas constant, x (which is different from X) the degree of saturation of the active storage material (for the definition thereof see below) being 0 when "empty" (fully depleted under conditions of use or operation; see also the definition hereinabove) and 1 when "full" (fully saturated; see also the definition hereinabove), M is a constant, p is the pressure in the container and $p_{eq}$ is a pseudo equilibrium pressure (as defined hereinafter) of the active storage material, T is the temperature of the active storage material and n' is the number of moles of active ammonia sites in the active material, i.e. sites, where ammonia molecules can be desorbed from under the given conditions (often not all ammonia sites are active, i.e. ammonia cannot be desorbed from all ammonia sites present in the storage medium under the conditions of operation).

Hence, in some of the embodiments, the model equation is based on the equation of state for ideal gases, a flow rate and an expression for the absorption/desorption rate from the storage medium.

Figure 2:
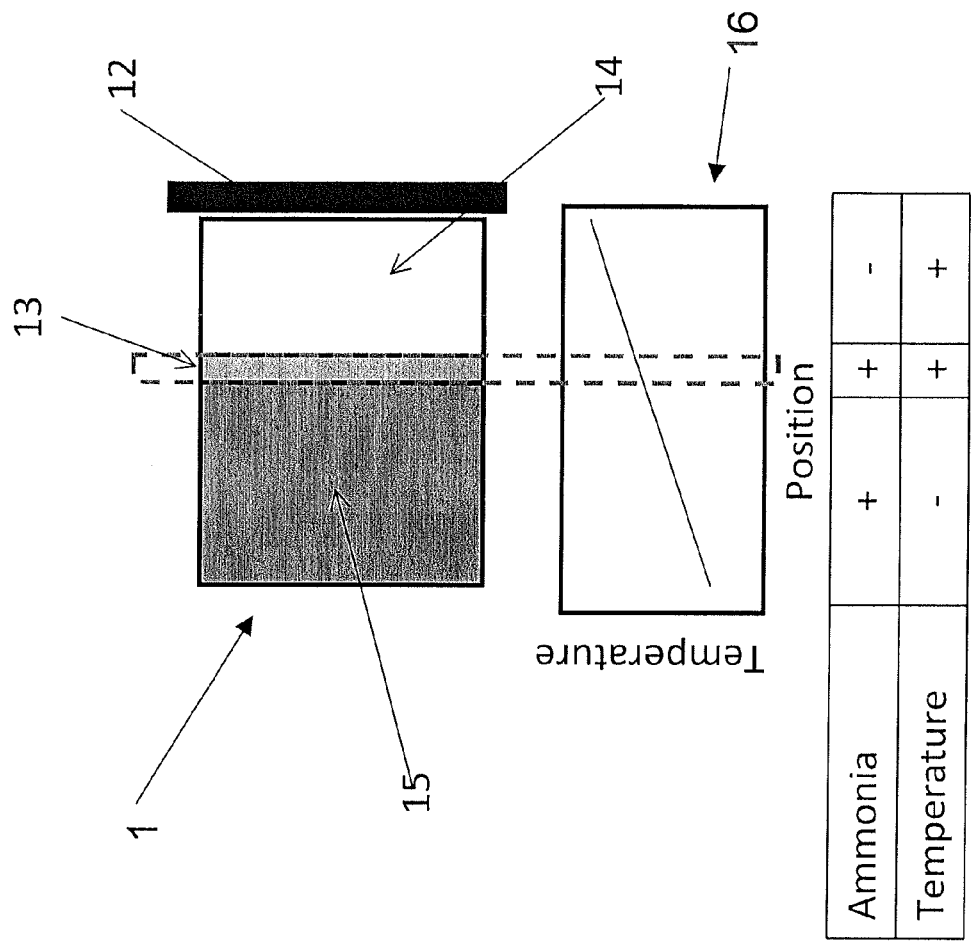
FIG. 2 schematically shows an ammonia and temperature distribution within ammonia-containing storage medium in the ammonia storage cartridge.

Due to the transient nature of the parameters of the storage medium during operation, defining a single temperature and corresponding equilibrium pressure of the storage medium in the container would not always result in a good representation of the real system. Instead, in some embodiments the notions of active storage material and pseudo equilibrium pressure are introduced. The active storage material is defined as the portion of the (partially or fully) saturated storage material in the container that has the highest temperature, as shown in FIG. 2. The active material is the material that is capable of desorbing ammonia at the given pressure in the container.

The pseudo equilibrium pressure $p_{eq}$ of the active storage material is the pressure which will adjust itself when dosing or degassing from the container is stopped.

The pseudo equilibrium pressure is linked to the temperature of the active material through the van't Hoff equation:

$$\ln \frac{p_{eq}}{p_0} = -\frac{\Delta H}{RT} + \frac{\Delta S}{R}.$$

wherein $p_{eq}$ is the pseudo equilibrium pressure, $p_0$ is the pressure at standard conditions, R is the gas constant, $\Delta H$ is the change in enthalpy and $\Delta S$ is the change in entropy at desorption.

The amount of active material and its temperature vary in time and cannot be measured directly. If the pseudo equilibrium pressure can be estimated then the temperature of the active storage material can be estimated through the van't Hoff equation.

Although not necessarily required, $p_{eq}$ is a helpful parameter in the method of the invention. A possible experimental determination of $p_{eq}$ will be described hereinafter.

In analogy to Rateeq, however in a more general way, the rate n can be expressed as follows:

$$r_i = u \psi(p_{eq,i}, p_i, T_i)$$

where u is a constant (in the specific case of Rateeq, $u = n'k_0 x^M$) and $\psi$ is a function of $p_{eq}$, p and T (in the specific case of Rateeq, $\psi = \exp(E_a/RT_i)(P_{eq,i}-p_i)/P_{eq,i}$).

Now the new quantities $P_n$, $W_n$, and $F_n$ are introduced and defined through the following relations:

$$\frac{V}{RT}(p_n - p_1)/\Delta t := VP_n \quad (1)$$

$$\sum_{i=1}^{n} r_i = u \sum_{i=1}^{n} \psi_i(p_{eq}, p_i, T_i) := uW_n \quad (2)$$

and $$\sum_{i=1}^{n} f_i := F_n \quad (3)$$

The temperature T in (1) is assumed in a good approximation to be identical to the temperature T in (2).

With these definitions Modeleq reads:

$$0 = uW_n - F_n - VP_n \quad \text{(Modeleq1)}$$

or equivalently:

$$W_n = \frac{F_n + VP_n}{u} \quad \text{(Modeleq 2)}$$

This is the numerical model, where the fitting parameters (the parameters to be determined) are
- the model volume V in the container, which is directly related to the degree of saturation, and
- the parameter u (that is an indirect measure of the amount of active material, e.g. via the parameter n' in Rateeq; this quantity is not analysed any further herein.)

This is a possible general model. Thus, determining the model value V uses an equation, referred to as the model equation or Modeleq, (of a potentially simplified model) with a certain degree of freedom, also referred to as dfree. In the present example the model equation has two variables, the model value V and the parameter u. The degree of freedom is therefore 2. The number n of sampled pairs ($f_i$, $p_i$) is greater than the degree of freedom dfree. This means that the equation Modeleq is overdetermined. It is known in probability theory and statistics that if more independent measurements are carried out than required to solve an equation, the result approaches towards what one expects to obtain "in average" with an increasing number of measurements; because independent statistical errors become smaller with an increasing number of measurements. However, an overdetermined equation has no direct solution, but an estimate value of a variable of the equation can be determined by a statistical estimator for the variable, A suitable estimator is e.g. that value of the variable which has the maximum likelihood under the given measurement values. In some embodiments, an approximate solution of the equation Modeleq, i.e. an estimate volume value $V_{fit}$, is found by an estimator minimising a distance measure between the equation and the sampled pairs ($f_i$, $p_i$). In some embodiments the number n of sampled pairs ($f_i$, $p_i$) is greater than dfree+about 50, or greater than dfree+about 100.

In some embodiments, the estimator that minimises the distance measure is a square-distance measure (Euklidian distance measure). Applying this estimator includes minimising the distance by a least-square method (also referred to "least square fit"). This estimator reveals a maximum-likelihood estimate volume value $V_{fit}$ of $V_{free}$. Such procedures of finding a best approximate solution is also known as "fitting". Thus, in order to obtain an estimate volume value from the general model equation in a concrete situation, the variable parameters u and V can be fitted to the measured values of $f_i$ and $p_i$.

There are several fitting algorithms to estimate the values u and $V_{fit}$. As, mentioned, one example is the method of least squares.

Least Square Fitting of u and $V_{fit}$:
Based on (Modeleq 1), the residual $R_n$ is defined as:

$$R_n = uW_n - F_n - VP_n$$

The sum of residuals squared S is $$S(u, V) = \sum_{j=1}^{m} R_j^2$$

$$= \sum_{j=1}^{m} (uW_j - F_j - VP_j)^2$$

$$= \sum_{j=1}^{m} (u^2 W_j^2 + F_j^2 + V^2 P_j^2 + 2VF_j P_j - 2uF_j W_j - 2uVP_j W_j)$$

$$= u^2 \sum_{j=1}^{m} W_j^2 + \sum_{j=1}^{m} F_j^2 + V^2 \sum_{j=1}^{m} P_j^2 + 2V \sum_{j=1}^{m} F_j P_j - 2u \sum_{j=1}^{m} F_j W_j - 2uV \sum_{j=1}^{m} P_j W_j$$

The best values of u and $V_{fit}$ to fit the model to data are obtained by minimizing $S(u,V)$. To this end, the following equations are solved:

$$\frac{\partial S(u, V)}{\partial u} = 2u \sum_{j=1}^{m} W_j^2 - 2 \sum_{j=1}^{m} F_j W_j - 2V \sum_{j=1}^{m} P_j W_j = 0$$

$$\frac{\partial S(u, V)}{\partial V} = 2V \sum_{j=1}^{m} P_j^2 + 2 \sum_{j=1}^{m} F_j P_j - 2u \sum_{j=1}^{m} P_j W_j = 0$$

The solution minimizing $S(u,V)$ for given (measured) values of $F_j$, $P_i$ and $W_j$ is $$u = \frac{\sum_{j=1}^{m} F_j W_j \sum_{j=1}^{m} P_j^2 - \sum_{j=1}^{m} F_j P_j \sum_{j=1}^{m} P_j W_j}{\sum_{j=1}^{m} W_j^2 \sum_{j=1}^{m} P_j^2 - \left(\sum_{j=1}^{m} P_j W_j\right)^2} \quad \text{(Fiteq)}$$

$$V_{fit} = \frac{\sum_{j=1}^{m} F_j W_j \sum_{j=1}^{m} P_j W_j - \sum_{j=1}^{m} F_j P_j \sum_{j=1}^{m} W_j^2}{\sum_{j=1}^{m} W_j^2 \sum_{j=1}^{m} P_j^2 - \left(\sum_{j=1}^{m} P_j W_j\right)^2}$$

In order to assess the quality of an estimate value $V_{fit}$ obtained, the latter can be compared to the free volume $V_{free}$ measured with high precision e.g. via a virtually ideal gas at suitable conditions (low temperature), Choosing the Time Interval $[t_1, t_2]$ If the temperature distribution inside the cartridge changes, the amount of storage material/storage medium that is capable of desorbing ammonia at the pressure in the cartridge will change. In this case u is not constant and the determination of $V_{fit}$ becomes more difficult. Thus, it is advantageous to choose the time interval $[t_1, t_2]$ to be short compared to the time scale of temperature changes in the cartridge. The cartridges used for SCR $NO_x$ reduction system on trucks and for passenger cars are often in the size of about 0.5 L to about 30 L. For those, it is desirable that the time interval is short, in general from about 5 seconds to about 2 minutes, e.g. shorter than about 1 minute, about 30 seconds, or about 10 seconds.

Estimating $p_{eq}$ and T:

Often, the rate r depends on T and $p_{eq}$, and for determining $W_n$, it is desirable to estimate $p_{eq}$ and T. Often the equilibrium pressure (in the present case: the pseudo equilibrium pressure) can be expressed as a function of the temperature and the known parameters of the desorption enthalpy change $\Delta H$ and the desorption entropy change $\Delta S$ of the active material by means of the van't Hoff relationship:

$$\ln \frac{p_{eq}}{p_0} = -\frac{\Delta H}{RT} + \frac{\Delta S}{R}$$

wherein furthermore R and $p_0$ are as defined above.

Thus, it is only necessary to estimate one of T or $p_{eq}$. One way of estimating $p_{eq}$ is to choose $$p_{eq} \approx \text{Max}(p_i), t_1 \leq t_i \leq t_2$$

It is advantageous that some time during the time interval $[t_1, t_2]$, preferably in the beginning, the flow is low, preferably zero, causing the measured pressure $p_i$ to approach $p_{eq}$.

In a concrete situation, e.g. while driving a car, for measuring $p_{eq}$ there is for example a first time interval of about 5 sec to about 2 min, preferably < about 1 minute, more preferably < about 30 second, e.g. < about 10 seconds, chosen where there is no flow of ammonia out of the container, and then there is a time interval of about 5 sec about 2 min, preferably < about 1 minute, more preferably < about 30 second, e.g. < about 10 seconds, chosen where the flow is constant and preferably higher than what is momentarily needed by a consumer of the ammonia.

Such a measuring cycle during driving is possible in the case of SCR, since the SCR catalyst for has a certain storage capacity for ammonia. After the period without dosing ammonia to the SCR, a constant amount which is preferably higher than what is momentarily needed by the SCR so as to replenish the storage of the SCR catalyst.

Other ways of estimating $p_{eq}$ exist, for example estimating $p_{eq}$ solely from measured values of $p_i$ during dosing events of normal operation (see the below).

Figure 4:
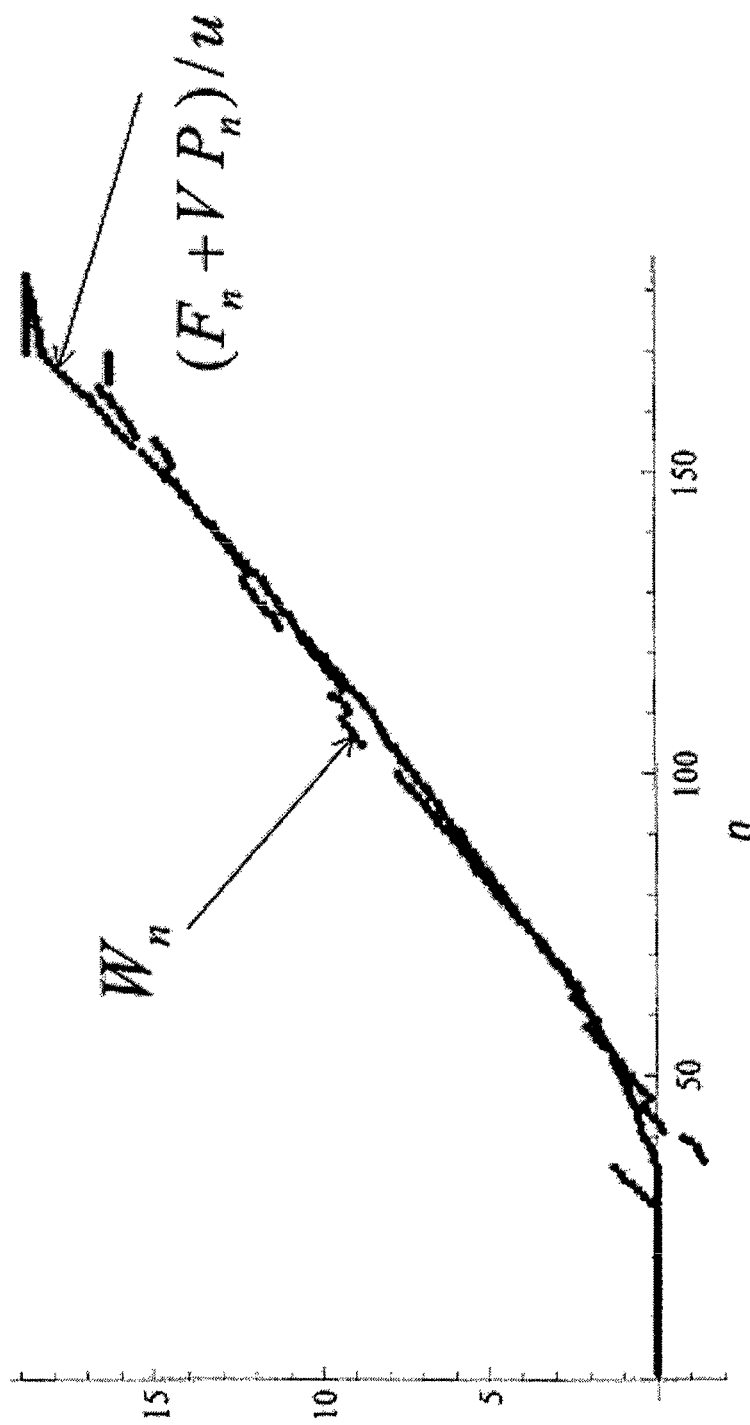
FIG. 4 shows an example of least square fitting of the method using the data of FIG. 3.
Figure 7:
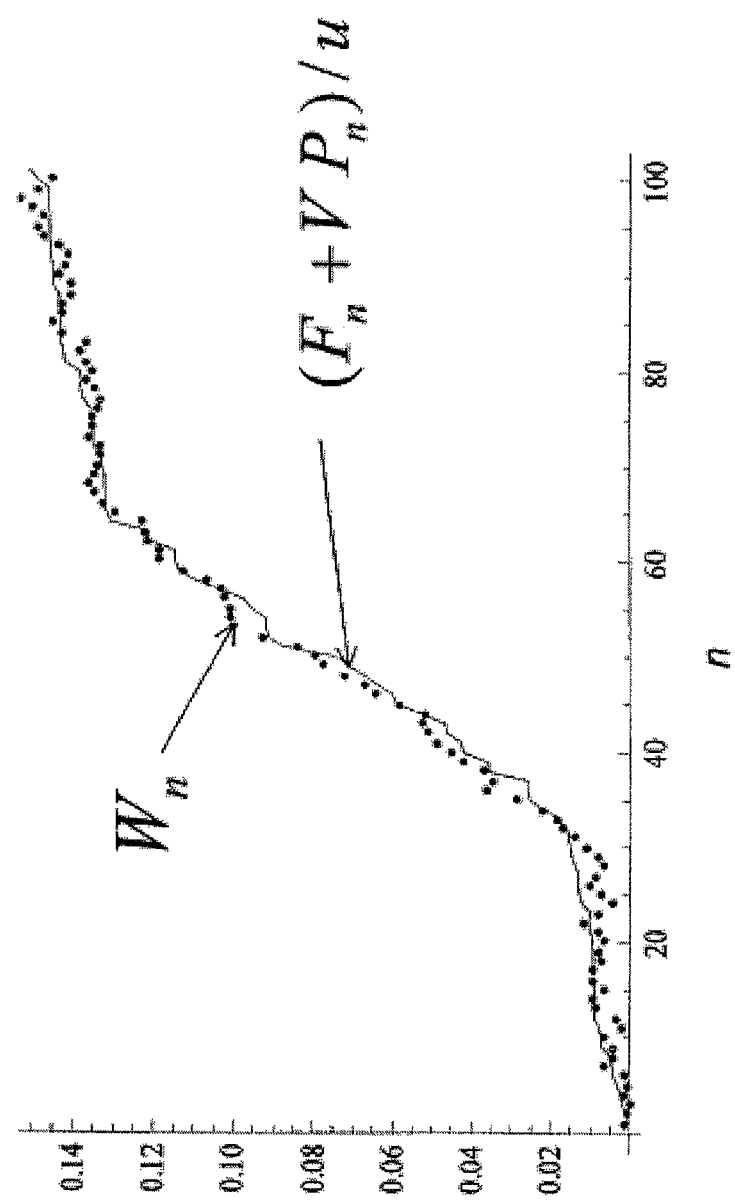
FIG. 7 shows an example of least square fitting of the method using the data of FIG. 6.

Relationship (Rel) Between the Estimate Volume Value $V_{fit}$ for the Free Volume $V_{free}$ of the Container and the Degree of Saturation with Ammonia X Empirically, the relationship Rel between a plurality of estimate volume values $V_{fit}$ and a plurality of values of the degree of saturation X may be predetermined in a general way as follows. A cartridge is degassed to a number of fixed filling levels (or average saturation degrees), The filling level can be verified e.g. by weighing the cartridges. At each of these fixed filling levels, a least two dosing (or outflow) events are performed and the flows and associated pressures are measured. By means of these data, for each of these known filling levels the estimate volume value $V_{fit}$ is, determined, by applying the same algorithm (in particular the same model equation, the same distance measure, etc) as the one which is later applied during operation to determine an estimate volume value $V_{fit}$ based on the then measured sampled pairs $((f_i, p_i), (F_i, p_i))$ of flows $(f_i)$, or accumulated flows $(F_i)$, and pressures $(p_i)$ at a sequence of points of time $(t_i)$. A linear fit is then applied to estimate volume values $V_{fit}$ obtained in this manner for the known filling levels. At this stage, a general relationship between the estimate volume value $V_{fit}$ and the filling level X has been obtained. However, due to the assumptions in the model regarding e.g. temperature, there might be slight, but insignificant variations; thus, the slopes of the straight lines of FIGS. 4 and 7 are not completely, but almost identical.

By applying the same algorithm (in particular the same model equation or, more general, the same estimator) to determine the estimate volume values $V_{fit}$ for the known filling levels in the process of determining the predetermined relationship as the one which is later applied during operation to determine an estimate volume value $V_{fit}$ based on the then measured sampled pairs $((f_i, p_i), (F_i, p_i))$ it is ensured that most of the systematic errors of the volume estimation algorithm (in particular systematic errors due to assumptions made in the model underlying the model equation) cancel. This is because such systemic errors—which are made when the algorithm to determine the estimate volume value $V_{fit}$ is carried out on the measured sampled pairs $((f_i, p_i), (F_i, p_i))$ during operation—are inversely included, by construction, in the predetermined relationship which is subsequently applied to the determined estimate volume value $V_{fit}$ in order to obtain the filling level.

In some of the embodiments, the predetermined relationship Rel between the estimate volume values $V_{fit}$ and the degree of saturation with ammonia X is stored in form of a look-up table.

Some embodiments are based on a predetermined relationship (Rel) which is not obtained empirically, but from knowledge about the density or the crystal (or molecular) structure of the storage medium at different saturation levels. In those embodiments it is also true that the same algorithm to determine the estimate volume values $V_{fit}$ for the known filling levels in the process of determining the predetermined relationship as the one which is later applied during operation to determine an estimate volume value $V_{fit}$ based on the then measured sampled pairs $((f_i, p_i), (F_i, p_i))$ is used, in order that systematic errors should cancel.

The densities $\rho$ of the storage material at different saturation degrees are known from the literature or can be measured in the usual way e.g. after growing single crystals or compacting the storage material at different saturation degrees in a mechanical press (The density of the fully saturated storage material is denoted $\rho_{sat}$, see above).

The densities $\rho$ can also be obtained from x-ray diffraction experiments and/or ab initio calculations of the molecular structure, such as density functional theory (DFT) calculations. The molecular structure directly translates into the density.

In the following, the estimate value $V_{fit}$ is inserted as a concrete value for the free volume $V_{free}$ the predetermined relationship to obtain an estimate of the degree of saturation with ammonia X. from the predetermined relationship. This is a good approximation for the intended purpose. With this assumption and the knowledge of the $\rho$'s of the storage material with different average saturation degrees X, the average saturation degree X can be calculated as follows.

The amount of available ammonia present in the fully saturated storage material is referred to as $m_{amm,sat}$, the amount of ammonia in the partially or fully depleted storage material as $m_{amm}$ (see above). The difference is the amount of ammonia that was desorbed from the storage material e.g. during operation of the cartridge referred to as $m_{amm,des}$. Thus, $m_{amm,sat} - m_{amm,des} = m_{amm}$.

The mass of fully saturated ammonia storage material in a container is referred to as $m_{sat}$ (see above). This mass is known, if the container was filled with fully saturated storage material. The mass of storage material not fully saturated (partially ammonia-depleted or fully ammonia-depleted) is referred to as m.

Furthermore, $mp = V_{con} - V_{free}$, i.e. the volume of the partially saturated material in its compacted or single-crystalline form, or $m = (V_{con} - V_{free})/\rho$.

Furthermore, the mass of the partially saturated (or ammonia-depleted) storage material is the mass of the saturated material minus the mass of ammonia desorbed: $m = m_{sat} - m_{amm,des}$.

Thus, $m_{sat} - m_{amm,des} = (V_{con} - V_{free})/\rho$ or $-m_{amm,des} = (V_{con} - V_{free})/\rho - m_{sat}$ or $$m_{amm,des} = (-V_{con} + V_{free})/\rho + m_{sat}$$

As defined above, $$X = m_{amm,des}/m_{amm,sat},$$

wherein $m_{amm,sat}$ is known from $m_{sat}$, since the fraction $\phi_{sat} = m_{amm,sat}/m_{sat}$ is a material constant of $m_{sat}$ and thus known.

In the above discussion it is assumed that p (and implicitely X) of the storage material inside the container is uniform. If this is not the case, the value of $\rho$ will vary over the cartridge, thus being replace by many $\rho$'s $(\rho_i; I=1 \ldots n)$ and thus many X's $(X_i; i=1 \ldots n; X_i$ is usually still an average degree of saturation, since the degree of saturation can often vary from molecule to molecule). However, $\rho$ often changes linearly with the average degree of saturation (an example thereof is the desorption of $Sr(NH_3)_8Cl_2$ to $Sr(NH_3)Cl_2$). In this case, the $\rho_i$ can be replaced by an average $\rho_{ave}$ and $X_i$ can be replaced by X, the average saturation degree of the whole storage material in the container.

With the above-discussed calculation of X, the relation Rel between the determined value of the free volume $V_{fit}$ and the average degree of saturation with ammonia X of the ammonia storage medium can be determined during operation for each individual cartridge without the need of acquiring any experimental data other than flows $f_i$ and the pressures $p_i$. If the determined relationship Rel deviates significantly from a stored average relationship Rel, the storage material was not fully saturated when the cartridge was commissioned.

In some of the embodiments, e.g. for establishing the predetermined relationship Rel between a plurality of estimate volume values $V_{free}$ and a plurality of values of the degree of saturation X, the estimate value $V_{fit}$ for the free volume $V_{free}$ is obtained by means of a special dosing sequence particularly well-suited for determining the estimate volume value $V_{fit}$, e.g. a dosing sequence comprising an interval of no ammonia dosing followed by an interval of well-defined, generally constant dosing. The respective time intervals may be each from about 5 seconds to about 2 minutes, shorter than about 2 minutes, about 1 minute, about 30 seconds, or about 10 seconds.

In some of the embodiments, the filling level is obtained by calculating an average of estimate volume values $V_{fit,j}$ for the free volume $V_{free}$ determined for different time intervals $\Delta t_j$ and using the pre-determined relationship Rel.

In some of the embodiments, in operation, the estimate volume value $V_{fit}$ for the free volume $V_{free}$ (and, by using the relationship Rel the filling level X) is determined by means of normal dosing events, i.e. dosing events taking place during normal use of the cartridge e.g. during driving and in dependence of the requirements of the SCR catalyst for deNOxing the exhaust gas.

These normal dosing events may represent a short period of continuous dosing or of very fast pulse dosing which does not result in pressure oscillations.

In some embodiments knowledge of the flow f cannot be obtained as a measured value $f_i$ of an essentially continuous flow. Other dosing principles include for example fast pulsed dosing or other step-changes in the flow. Often such dosing systems provide direct information about accumulated flow F' as function of time rather than the flow f. Since $F'_j$ is related to $F_i$ through $$F'_i = \sum_{j=1}^{i} f_j \Delta t = F_i \Delta t \text{ or } F_i = F'_i / \Delta t,$$

Knowledge of $F'_i$ in these embodiments enters directly in the model equation (modeleq) as data for the algorithm.

In some cases non-continuous dosing induces pressure changes or oscillations that are not correlated with the dynamics of the storage material. In these situations the measured pressure can be replaced with an average over several discontinuities of the flow (average pressure).

Accordingly, the measured pairs of accumulated flow and pressure ($F'_j$, $p_j$) can directly be used as input for the method.

In some embodiments the pseudo equilibrium pressure is determined as the pressure of the cartridge after setting the flow to zero for a time interval of about 2 minutes, about 1 minute, about 30 sec, about 10 sec or about 5 sec. The free volume $V_{fit}$ is then determined during normal dosing events using the above-measured $p_{eq}$.

In some embodiments the pseudo equilibrium pressure is estimated solely from measured values of $p_i$ during dosing events of normal operation, and the estimate volume value $V_{fit}$ is calculated from the measured values $p_i$ and the corresponding measured values $f_i$.

The invention is useful for any kind of system configuration including modular systems with one or more main storage cartridges and a smaller unit for fast start-up. The method can be applied to both a small start-up unit and one or more of the main cartridges.

The method can, of course, also be applied to determine, if a storage cartridge is full after a vehicle has been at service for cartridge replacement. The method can be used during the first driving period after cartridge servicing to detect if a 'new' cartridge that has replaced a depleted unit is actually a 'new' unit that has a high storage capacity.

Generally, the invention may be used for OBD (On-Board Diagnostics) of systems installed in vehicles/application for the purpose of removing $NO_x$ from the exhaust of an internal combustion engine, particularly for determining if a cartridge has to be replaced or for determining if a replacement cartridge (temporarily) installed on a vehicle is full, in order to avoid the (final) installation of a depleted unit on the vehicle.

In another aspect the invention is directed to a system comprising an ammonia storage container containing a solid ammonia storage medium capable of ad- or absorbing and desorbing ammonia reversibly, a dosing device arranged to control or measure the ammonia flow out of the ammonia storage container, a pressure sensor arranged to measure the pressure in the ammonia storage container, and an electronic control unit arranged to collect data of pressure ($p_i$) and flow ($f_i$) and perform the above-described method to determine the degree of saturation with ammonia (X) of the solid ammonia storage medium in the ammonia storage container.

In some of the embodiments, the system further comprises a device arranged to heat the solid ammonia storage medium, such as an electric heater, heating with hot exhaust gas or hot engine coolant.

In still another aspect the invention is directed to a computer program product which is either in the form of a machine-readable medium with program code stored on it, or in the form of a propagated signal comprising a representation of program code. The program code is arranged to carry out the above described method and embodiments thereof, when executed on a computer system, i.e. a method of determining an average saturation degree with ammonia (filling level of ammonia) X of a solid ammonia storage medium in an ammonia storage container. The method is based on a model equation describing a relationship between flows and associated pressures at a sequence of points of time. In the model at least an estimate volume value $V_{fit}$ for the free volume $V_{free}$ of the container (which is occupied by gaseous ammonia) is determined. The method is further based on a predetermined relationship Rel between a plurality of the estimate volume values $V_{fit}$ of the free volume $V_{free}$ and a plurality of the average saturation degree with (filling level of) ammonia X. The method includes sampling n pairs of flows and pressures $f_i$, $p_i$, i=1 ... n, determining that value $V_{fit}$ for the free volume $V_{free}$ that best fits the model equation to the pairs $f_i$, $p_i$, and determining the filling level X by inserting the determined $V_{fit}$ in a predetermined relationship between a plurality of values of the estimate volume value $V_{fit}$ and a plurality of values of the filling level X of ammonia.

Some of the embodiments of the computer program product with program code for performing the described methods include any machine-readable medium that is capable of storing or encoding the program code. The term "machine-readable medium" shall accordingly be taken to include, for example, solid state memories and, removable and non removable, optical and magnetic storage media. The program code may be machine code or another code which can be converted into machine code, such as source code in a multi-purpose programming language, e.g. C, C++, Java, C#, etc.

Specific Embodiments

FIG. 1 schematically shows a system layout of a system applying the method of determining a filling level of an ammonia storage cartridge 1. The system includes an ammonia storage cartridge 1, a pressure sensor 2 and a dosing device 3 adjusting the flow f in predetermined time intervals according to the requirement of a consumer 10. Optionally, a start-up unit 4 is connected to the outlet line 7 of the ammonia storage cartridge 1 through a valve 5 to avoid that the start-up has influence on the algorithm The data of flow and pressure are sent to an ECU (Electronic Control Unit) 6 where the method according to the invention is used to determine the filling level of the ammonia storage cartridge 1.

FIG. 2 shows the ammonia storage cartridge 1 in more detail. The cartridge 1 contains storage material (here strontium chloride ($Sr(NH_3)_8Cl_2$)) which can store ammonia reversibly by binding the ammonia in the form of a complex. Furthermore, the cartridge 1 is provided with a heating element 12 which heats the storage material and causes a gradual degassing of ammonia from the ammonia-containing storage material in zones starting at the heating element 12 and migrating towards the opposite side of the cartridge 1. In the situation shown in FIG. 2, the right zone 14 of the cartridge 1 has already been degassed and now only contains empty storage material (i.e. storage material that cannot desorb ammonia any more under the conditions given) at a high temperature, while the left zone 15 of the cartridge 1 contains saturated storage material at a low temperature. The middle zone 13 between the left and right zones 14 and 15 of the cartridge 1 contains the currently active material which has the right temperature for desorbing the ammonia at the given pressure in the container. Accordingly, the active material is the portion of storage material in the container still containing ammonia (which can be desorbed) that has the highest temperature.

A diagram 16 below the cartridge 1 depicts the temperature distribution of the storage container 1 shown in FIG. 2. There is a negative temperature gradient from the heating element to the opposite end of the cartridge. The table below the diagram shows that in the zone having the highest temperatures there is no ammonia that can be desorbed left in the storage material. In the zone having an intermediate temperature, the material still contains at least some ammonia that can be and is desorbed, whereas in the zone having the lowest temperature the storage material is still fully saturated with ammonia.

The method of determining the filling level of the cartridge 1 will be explained in the two following examples with reference to FIGS. 3 to 8.

EXAMPLE 1

A 19.8 L cartridge filled with fully saturated strontium chloride ($Sr(NH_3)_8Cl_2$) is degassed to four different filling levels (average saturation degrees), 0.95 (95%), 0.8 (80%), 0.5 (50%) and 0.24 (24%) (this can be verified e.g. by weighing the cartridges). At each filling level a pulse dosing event of 100 mg/s for 15 s is initiated after a period of no dosing, as shown in the upper diagram of FIG. 3. The resulting pressure drops are shown in the lower diagram of FIG. 3. A clear tendency that the pressure drop is smaller when the cartridge is more depleted or degassed is seen.

Figure 3:
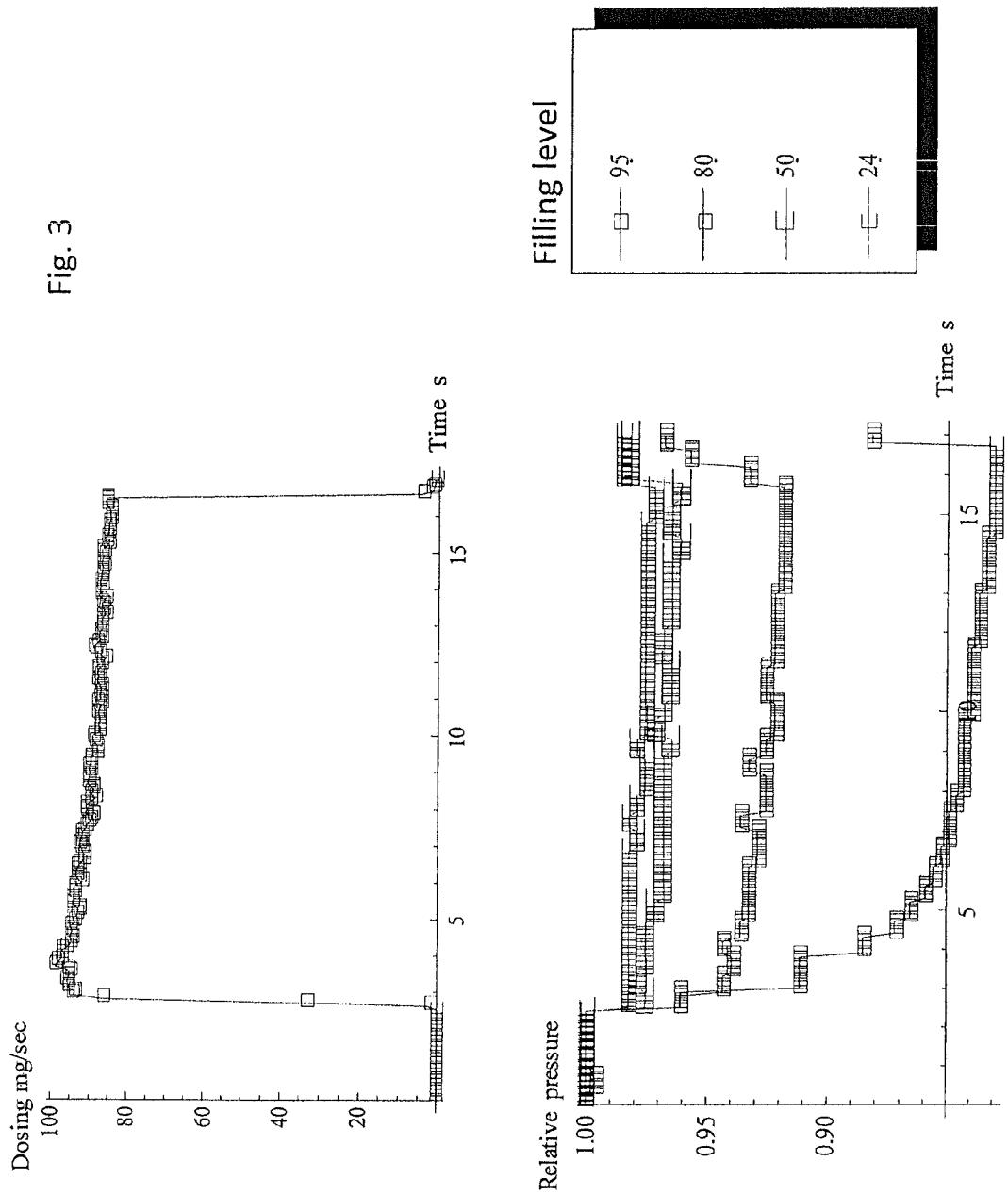
FIG. 3 refers to a first example of determining the average saturation degree of an ammonia-containing storage medium in an ammonia storage cartridge (filling level of the storage medium (or simply the cartridge)) and shows a dosing event from a 19.8 L cartridge and the corresponding pressure drops for different filling levels of the cartridge (or average saturation degrees of the ammonia storage material)

The data of FIG. 3 are used as input to the method.

In FIG. 4 the quality of the fit is shown by comparing the terms $(F_n+VP_n)/u$ and $W_n$ from the residual R using the fitted values of $V_{fit}$ and u. The number of measurements n is indicated on the abscissa. It is greater than 150, meaning that the number of sampled pairs exceeds the degree of freedom (=2) by 150, which is above 100, in the present example. The values calculated for $W_n$ and $(F_n+VP_n)/u$ are indicated on the ordinate. According to the equation (Modeleq2), the terms $(F_n+VP_n)/u$ and $W_n$ should ideally be the same, if the determined values of $V_{fit}$ and u perfectly fit the measured values.

Figure 5:
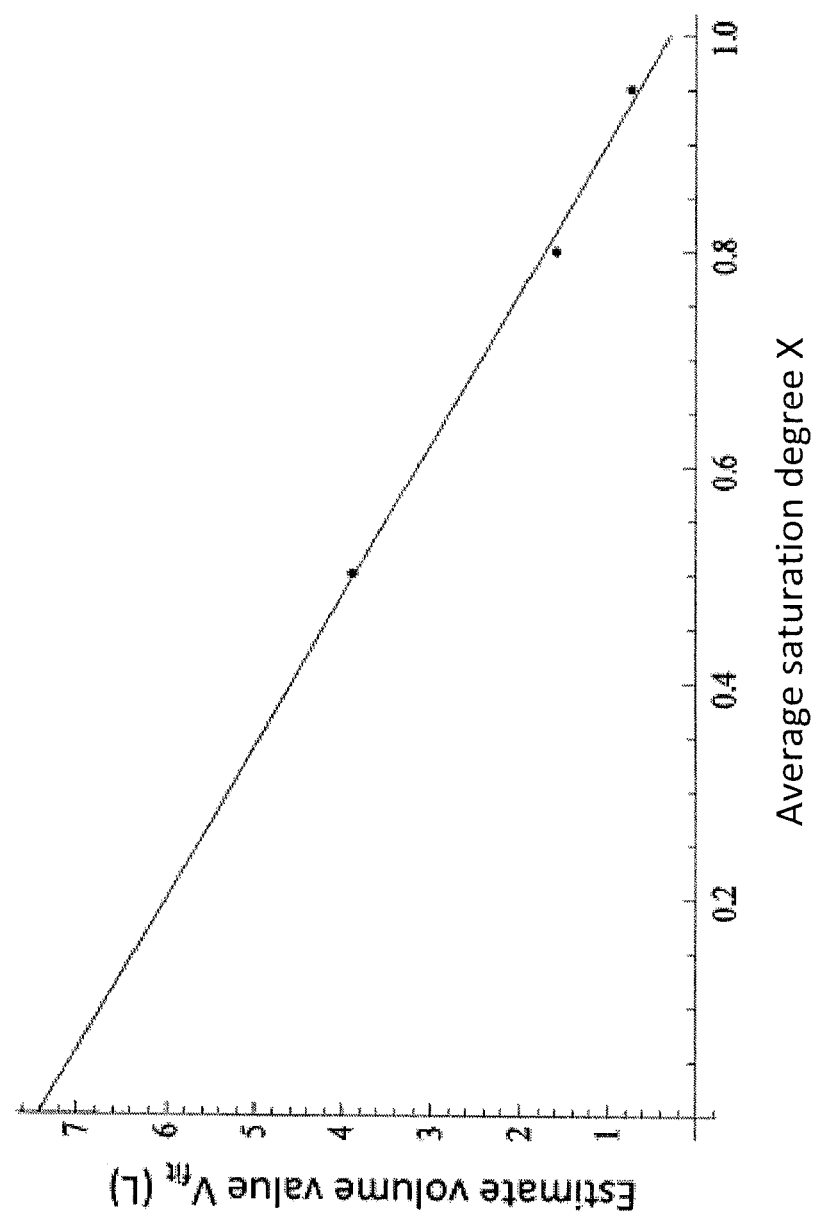
FIG. 5 shows a relationship between the estimate volume value and the average saturation degree (filling level) for the data shown in FIG. 3.

In FIG. 5, the estimate volume values $V_{fit}$ (in liters) are plotted against the average saturation degree X for the three average saturation degree values 0.95 (95%), 0.8 (80%) and 0.5 (50%). A linear fit is applied to obtain a saturation degree X for all other estimate volume values $V_{fit}$. As can be seen, the estimate volume values $V_{fit}$ and the corresponding three saturation degree values are almost in a linear relationship. The diagram shown in FIG. 5 represents the relationship Rel between the estimate volume value $V_{fit}$ determined in operation and the filling level X. It is stored in the ECU 6, for example in the form of a look-up table. If, in operation, the current estimate volume value $V_{fit}$ is determined based on the model equation (Modeleq), this relationship will be used to determine the filling level X of the cartridge.

EXAMPLE 2

Figure 6:
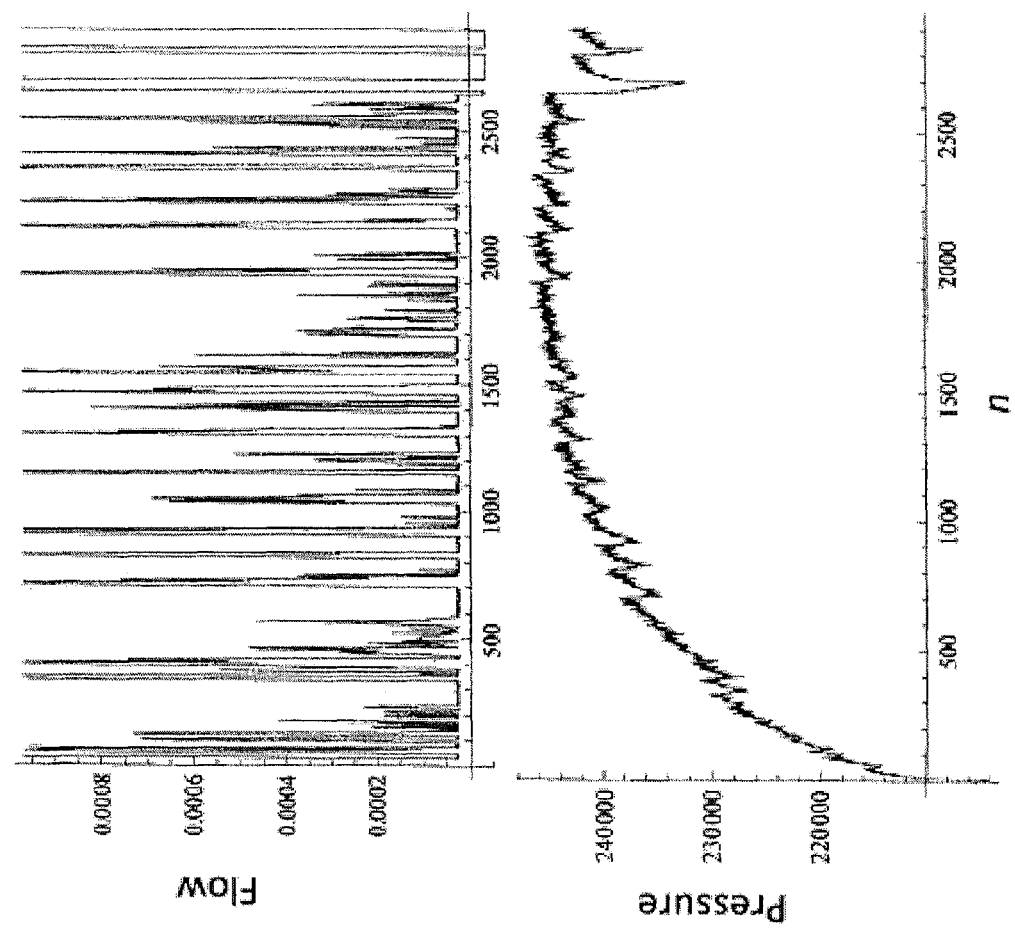
FIG. 6 refers to a second example of determining the filling level of an ammonia storage cartridge and shows dosing and corresponding pressure variations in an 8.8 L cartridge during normal driving.

An 8.8 L cartridge filled with fully saturated strontium chloride is degassed to three different filling levels 0.84 (84%), 0.63 (62%) and 0.30 (30%). At each filling level, ammonia dosing according to a demand of a New European Driving Cycle (NEDC) (http://www.dieselnet.com/standards/cycles/ece_eudc.html) is carried out, and the corresponding pressure variations in the cartridge are recorded, as shown in FIG. 6. While the upper diagram of FIG. 6 shows the variations of flow, the lower diagram of FIG. 6 depicts the corresponding pressure variations.

In FIG. 7 the method is applied to a single interval i<n<i+100 of the data of FIG. 6, namely to the 1000<n<1100 (indicated in the lower diagram of FIG. 6). The two plotted data sets show the quality of the fit.

Figure 8:
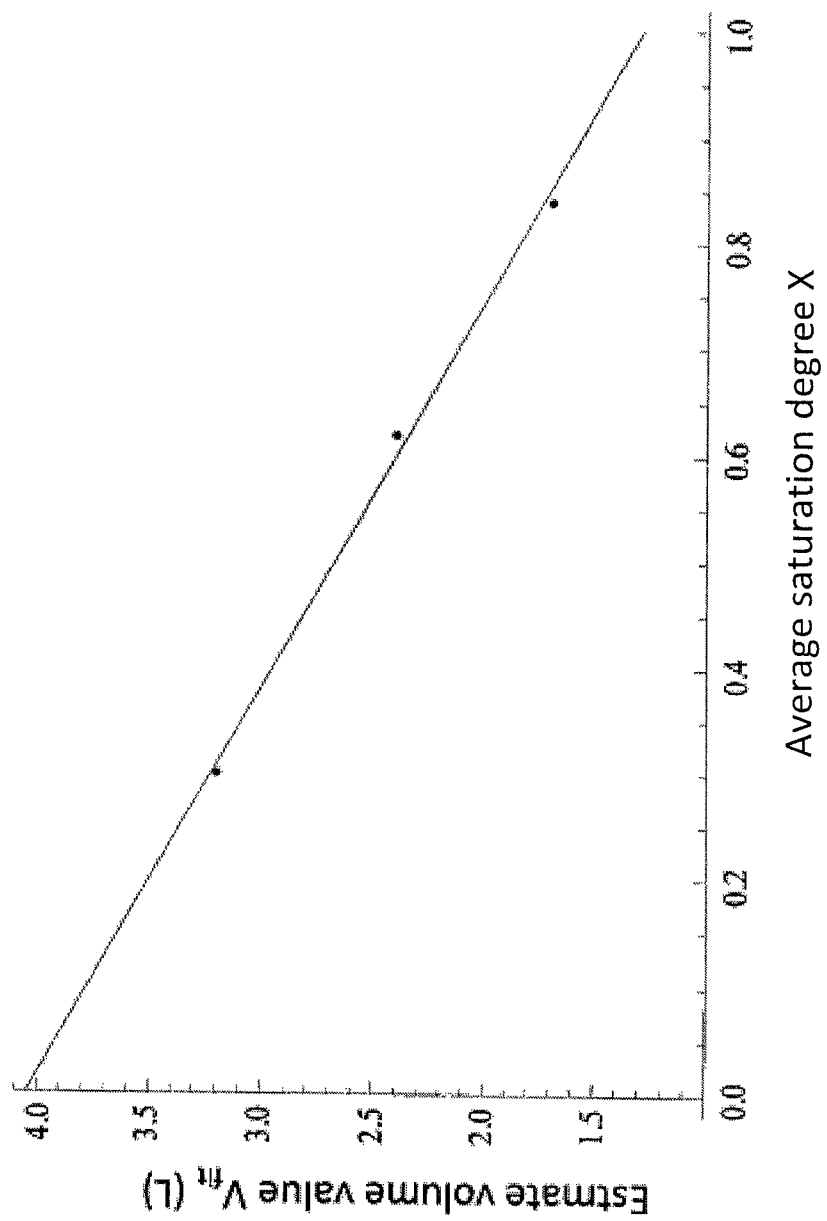
FIG. 8 shows a relationship between the estimate volume value and average saturation degree (filling level) for the data shown in FIG. 6.

In FIG. 8, the method is applied to all possible time intervals i<n<i+100 in the data shown in FIG. 6, and for each time interval an estimate volume value $V_{fit,i}$ is obtained. The average of $V_{fit,i}$ is plotted for the three different filling levels 0.84 (84%), 0.62 (62%) and 0.30 (30%). Finally, a linear fit is applied to obtain the relationship Rel between the average saturation degree X and the estimate volume values $V_{fit}$ (in liters).

In operation the predetermined relationship Rel shown in FIG. 5 or FIG. 8 is used to determine the filling level X given an estimate volume value $V_{fit}$, which is calculated from the model equation (Modeleq) based on sampled values of flows $f_i$ and associated pressures $p_i$ during dosing events.

The relevant disclosure of all references cited herein, such as patents, patent applications and journal articles, is hereby incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of determining an average degree of saturation with ammonia (X) of a solid ammonia storage medium porous or not and capable of ad- or absorbing and desorbing ammonia reversibly in a storage container having a container volume ($V_{con}$) and essentially free of gases other than gaseous ammonia, wherein a part of the container volume ($V_{con}$) is occupied by said ammonia having a pressure (p) and defines a free volume ($V_{free}$), said storage container having at least one opening through which ammonia flows out of the storage container with a flow (f), wherein the free volume ($V$free), the pressure (p) and the flow (f) vary with time (t), the method comprising:
sampling n pairs (($f_i,p_i$) ($F_i,p_i$)) of flows ($f_i$), or accumulated flows ($F_i$), and pressures ($p_i$) at a sequence of points of time ($t_i$), i=1 . . . n and n≧2;
determining an estimate volume value ($V_{fit}$) on the basis of the sampled pairs (($f_i,p_i$) ($F_i,p_i$)); and
determining the average degree of saturation with ammonia (X) of the solid ammonia storage medium by applying a predetermined relationship (Rel) between a plurality of estimate volume values ($V_{fit}$) and a plurality of values of the average degree of saturation with ammonia (X) of the solid ammonia storage medium to the determined estimate volume value ($V_{fit}$); wherein said method is carried out by a computer system or an electronic control unit.

2. The method of claim 1, wherein said determining of the value of the free volume ($V_{fit}$) comprises using a model equation (Modeleq) for a model value (V) for the free volume ($V_{free}$) with a degree of freedom (dfree), wherein the number n of sampled pairs (($f_i,p_i$) ($F_i,p_i$)) is greater than the degree of freedom (dfree), meaning that said model equation (Modeleq) is overdetermined, wherein determining the estimate volume value ($V_{fit}$) comprises finding an approximate solution of said model equation (Modeleq) by minimising a distance measure between the model equation and the sampled pairs (($f_i,p_i$) ($F_i,p_i$)).

3. The method of claim 2, wherein the distance measure is a square-distance measure, and minimising the distance is applying a least-square method.

4. The method of claim 2, wherein said determination of the estimate volume value ($V_{fit}$) comprises:
establishing a model equation (Modeleq) describing a relationship between flows ($f_i$), or accumulated flows ($F_i$), and associated pressures ($p_i$) at a sequence of points of time ($t_i$), i=1 ... n and n≧2, the model equation (Modeleq) having a model value (V) for the free volume ($V_{free}$) of the container (1), a rate of ad- or absorption/desorption (r) with which ammonia is desorbed from the solid ammonia storage medium, and a temperature (T) and/or an equilibrium pressure ($p_{eq}$) of the storage container content as parameters to be determined, and
determining the estimate volume value ($V_{fit}$) that best fits the model equation (Modeleq) to the sampled pairs (($f_i$, $p_i$) ($F_i,p_i$)).

5. The method of claim 4, wherein the determination of the estimate volume value ($V_{fit}$) is accomplished by the determination of r in the model equation (Modeleq) involving the determination of the equilibrium pressure ($p_{eq}$) of active solid ammonia-containing storage medium, said active solid ammonia-containing storage medium being a part of the solid ammonia-containing storage medium ad- or absorbing/desorbing ammonia at the temperature (T) of the active solid ammonia-containing storage medium and the pressure p in the container, the temperature (T) being indirectly determined.

6. The method of claim 5, wherein the temperature (T) of the model equation (Modeleq) is equated with the temperature (T) of the active solid ammonia-containing storage medium the latter being determined by means of the van't Hoff equation given the equilibrium pressure ($p_{egq}$) of the active solid ammonia storage medium.

7. The method of claim 1, wherein said determination of the estimate volume value ($V_{fit}$) comprises:
establishing the model equation (Modeleq) describing a relationship between flows ($f_i$), or accumulated flows ($F_i$), and associated pressures ($p_i$) at a sequence of points of time ($t_i$),i=1 ... n and n≧2, the model equation (Modeleq) having a model value (V) for the free volume ($V_{free}$) of the container (1), a rate of ad- or absorption/desorption (r) with which ammonia is desorbed from the ammonia-containing storage medium, and a temperature (T) and/or an equilibrium pressure ($p_{eq}$) of the storage container content as parameters to be determined, and
determining the estimate volume value ($V_{fit}$) that best fits the model equation (Modeleq) to the sampled pairs (($f_i$, $p_i$) ($F_i,p_i$)).

8. The method of claim 7, wherein the determination of the estimate volume value ($V_{fit}$) is accomplished by the determination of r in the model equation (Modeleq) involving the determination of the equilibrium pressure ($p_{eq}$) of active solid ammonia-containing storage medium, said active solid ammonia-containing storage medium being a part of the solid ammonia-containing storage medium ad- or absorbing/desorbing ammonia at the temperature (T) of the active solid ammonia-containing storage medium and the pressure p in the container, the temperature (T) being indirectly determined.

9. The method of claim 8, wherein the temperature (T) of the model equation (Modeleq) is equated with the temperature (T) of the active solid ammonia-containing storage medium the latter being determined by means of the van't Hoff equation given the equilibrium pressure ($p_{egq}$) of the active solid ammonia storage medium.

10. The method of claim 1, wherein the estimate volume value ($V_{fit}$) is obtained during an ammonia outflow sequence involving a 5 to 120 s interval of no ammonia flow followed by a 5 to 120 s interval of well-defined flow.

11. The method of claim 10, wherein the two time intervals are 1 minute or less, 30 seconds or less, 10 seconds or less.

12. The method of claim 10, wherein the relationship (Rel) has been established by determining a plurality of different average degrees of saturation with ammonia (X) empirically and/or theoretically and a plurality of corresponding estimate volume values ($V_{fit}$) by sampling n pairs (($f_i,p_i$) ($F_i,p_i$))at a sequence of points of time ($t_i$), =1 ... n and n≧2 at each of the different average degrees of saturation (X).

13. The method of claim 1, wherein the saturation degree is determined during operation of an ammonia consuming process to which the ammonia outflow is dosed in the course of dosing events regularly used during operation for dosing ammonia.

14. The method of claim 1, wherein an average of several estimate volume values ($V_{fit}$) for the free volume ($V_{free}$) determined for different time intervals is obtained by calculating an average free volume ($V_{av}$) used for determining an average degree of saturation (X) of the storage medium.

15. The method of claim 1, wherein the determined average degree of saturation (X) of the storage medium is used for on-board diagnostics (OBD) or for determining, if a solid ammonia-containing storage medium in a replacement container installed on a vehicle is fully saturated.

16. The method of claim 1, wherein the predetermined relationship (Rel) between the plurality of estimated volume values ($V_{fit}$) and the plurality of values of the average degree of saturation with ammonia (X) is stored in form of a look-up table.

17. The method of claim 1 wherein the relationship (Rel) has been established by determining a plurality of different average degrees of saturation with ammonia (X) empirically and/or theoretically and a plurality of corresponding estimate volume values ($V_{fit}$) by sampling n pairs (($f_i,p_i$) ($F_{i,pi}$))at a sequence of points of time ($t_i$), 1=1 ... n and n≧2 at each of the different average degrees of saturation (X).

18. A system comprising
an ammonia storage container containing a solid ammonia storage medium capable of ad- or absorbing and desorbing ammonia reversibly, a dosing device arranged to control or measure the ammonia flow out of the ammonia storage container, a pressure sensor arranged to measure the pressure in the ammonia storage container, and
an electronic control unit arranged to collect data of pressure ($p_i$) and flow ($f_i$), or accumulated flow ($F_i$), and perform the method of of claim 1 to determine the average degree of saturation with ammonia (X) of the solid ammonia storage medium in the ammonia storage container.

19. The system of claim 18, further comprising
a device (12) arranged to heat the solid ammonia storage medium.

20. A computer program product in the form of a machine-readable medium with program code stored on it,
wherein the program code is arranged to carry out a method, when executed on a computer system, as defined in claim 1.

* * * * *